(12) United States Patent
Rakshit et al.

(10) Patent No.: US 12,430,815 B2
(45) Date of Patent: Sep. 30, 2025

(54) PREDICTING OBJECT DEFORMATION USING A GENERATIVE ADVERSARIAL NETWORK MODEL

(71) Applicant: International Business Machines Corporation, Armonk, NY (US)

(72) Inventors: Sarbajit K. Rakshit, Kolkata (IN); Sathya Santhar, Ramapuram (IN); Sridevi Kannan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 18/544,826

(22) Filed: Dec. 19, 2023

(65) Prior Publication Data

US 2025/0200824 A1 Jun. 19, 2025

(51) Int. Cl.
| | |
|---|---|
| *G06T 11/00* | (2006.01) |
| *G06N 3/0475* | (2023.01) |
| *G06V 10/82* | (2022.01) |
| *G06V 20/20* | (2022.01) |
| *G06V 20/52* | (2022.01) |

(52) U.S. Cl.
CPC ............ *G06T 11/00* (2013.01); *G06N 3/0475* (2023.01); *G06V 10/82* (2022.01); *G06V 20/20* (2022.01); *G06V 20/52* (2022.01)

(58) Field of Classification Search
CPC ...... G06T 11/00; G06N 3/0475; G06N 3/045; G06V 10/82; G06V 20/20; G06V 20/52
See application file for complete search history.

(56) References Cited

U.S. PATENT DOCUMENTS

| | | | |
|---|---|---|---|
| 11,393,135 | B1 | 7/2022 | Ferguson |
| 2013/0110482 | A1 | 5/2013 | Ellens |
| 2016/0267664 | A1 | 9/2016 | Davis |
| 2020/0311665 | A1* | 10/2020 | Gray .................... H04L 9/3263 |
| 2021/0150701 | A1* | 5/2021 | Thagaard ........... G06V 10/7753 |
| 2022/0189001 | A1* | 6/2022 | Fernandez ............. G06V 10/56 |
| 2022/0245431 | A1* | 8/2022 | Mehr .................... G06N 3/047 |
| 2025/0005942 | A1* | 1/2025 | Panetta ................ G06T 7/0012 |

FOREIGN PATENT DOCUMENTS

| | | |
|---|---|---|
| CN | 116740299 A | 9/2023 |
| CN | 120182654 A | 6/2025 |

* cited by examiner

*Primary Examiner* — Jitesh Patel
(74) *Attorney, Agent, or Firm* — Stosch Sabo

(57) ABSTRACT

Provided is a method, system, and computer program product for using a generative adversarial network to visually generate object deformation predictions. A processor may identify, based on an analysis of image data, a plurality of objects that are in a first stack formation. The processor may determine a load distribution of each object of the plurality of objects in relation to a subset of objects of the plurality of objects in the first stack formation. The processor may generate, using a generative adversarial network (GAN) algorithm and based on the load distribution for each object, a visualization depicting deformation of each object of the plurality of object in relation to the subset of objects of the plurality of objects in the first stack formation. The processor may display the visualization depicting the deformation of each object of the plurality of objects to a user.

20 Claims, 7 Drawing Sheets

| Product | Weight | Type | Package Type | Strength Type |
|---|---|---|---|---|
| Bananas | 1.5 lbs | Fruit | Bunch | Not easily Damaged |
| Water Bottles | 5.0 lbs | Liquid | Plastic Bottle | Not easily Damaged |
| Apple | 0.3 lbs | Fruit | None | Not easily Damage |
| Strawberries | 0.5 lbs | Fruit | None | Easily Damaged |
| Apple Pie | 3.0 lbs | Dessert | Thin Box | Easily Damaged |
| Bread | 0.2 lbs | Bread | None | Easily Damaged |
| Chips | 0.5 lbs | Snack | Bag | Easily Damaged |

PREDICTING OBJECT DEFORMATION USING A GENERATIVE ADVERSARIAL NETWORK MODEL

BACKGROUND

The present disclosure relates generally to neural network models and, more specifically, to generating object deformation predictions using a generative adversarial network (GAN) model.

Deformation refers to the alteration in the shape, size, or structure of an object due to external forces or conditions. Various types of deformation can occur in products such as vegetables, fruits, or packages, particularly when they are subjected to stacking in settings like shopping trolleys, product shelves, and trucks.

One common type of deformation is compressional deformation. This occurs when products are stacked on top of one another, exerting pressure on the lower objects or objects. In the context of vegetables and fruits, the weight of the objects above can cause the lower ones to become flattened, bruised, or even crushed. Similarly, packaged products can experience compression deformation if they are stacked too high or if heavy objects are placed on top of them. This type of deformation can lead to not only physical damage but also spoilage of delicate objects, reducing their quality and shelf life.

Another type of deformation is flexural deformation. This occurs when products are bent or curved due to the uneven distribution of weight or pressure. In the case of objects like fruits and vegetables, if they are stacked in a way that doesn't evenly distribute the load, it can cause bending or curving of the individual pieces. Moreover, packaged products with weak or inadequate packaging materials might bend or flex under the weight of the objects above, leading to misshapen packaging and potentially damaging the contents. Flexural deformation can result in aesthetics issues, reduced product appeal, and even potential structural weaknesses.

In summary, stacking products like vegetables, fruits, or packages in various settings can lead to different types of deformation. Compressional deformation can occur when objects are crushed under the weight of others, while flexural deformation involves bending or curving due to uneven pressure distribution. To mitigate these deformations and ensure product quality, proper packaging, stacking techniques, and load distribution strategies should be employed in storage, transportation, and display processes.

Deformation-related issues encompass a range of detrimental outcomes, including physical damage, breakage, and squeezing. When products are stacked without appropriate consideration for load distribution and structural integrity, they are susceptible to deformation due to the excessive weight applied from above. This deformation not only compromises the aesthetics of the products but also poses potential safety hazards, especially when dealing with fragile or perishable objects.

SUMMARY

Embodiments of the present disclosure include a method, system, and computer program product for using a generative adversarial network to visually generate object deformation predictions. A processor may identify, based on an analysis of image data, a plurality of objects that are in a first stack formation. The processor may determine a load distribution of each object of the plurality of objects in relation to a subset of objects of the plurality of objects in the first stack formation. The processor may generate, using a generative adversarial network (GAN) algorithm and based on the load distribution for each object, a visualization depicting deformation of each object of the plurality of object in relation to the subset of objects of the plurality of objects in the first stack formation. The processor may display the visualization depicting the deformation of each object of the plurality of objects to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
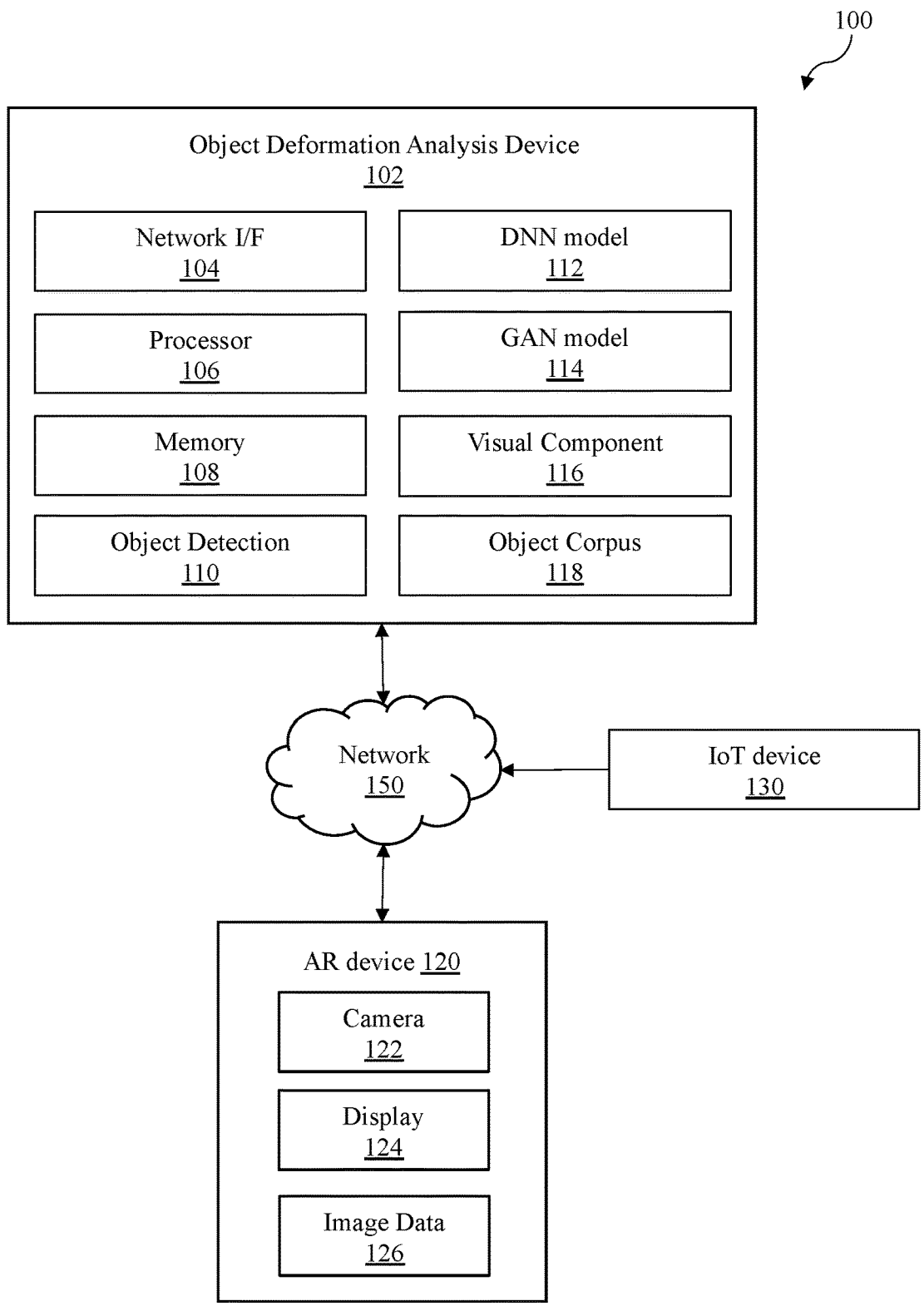
FIG. 1 illustrates a block diagram of an example object deformation analysis system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to generative adversarial networks and, more particularly, to generating object deformation predictions using a GAN model. While the present disclosure is not necessarily limited to such applications, various aspects of the disclosure may be appreciated through a discussion of various examples using this context.

According to an aspect of the invention, there is provided a computer-implemented method comprising identifying, based on an analysis of image data, a plurality of objects that are in a first stack formation, determining a load distribution of each object of the plurality of objects in relation to a subset of objects of the plurality of objects in the first stack formation, generating, using a generative adversarial network (GAN) algorithm/model and based on the load distribution for each object, a visualization depicting deformation of each object of the plurality of object in relation to the subset of objects of the plurality of objects in the first stack formation, and displaying the visualization depicting the deformation of each object of the plurality of objects to a user. This is advantageous because the method generates a visualization of predicted object deformation which may be used to notify the user that restacking and/or rearranging of the objects may be necessary. In this way, objects such as groceries, maybe be prevented from damage using the object deformation predictions.

In embodiments, the method may further comprise determining a time period that the plurality of objects will be in the first stack formation, generating, using the GAN algorithm and based on the load distribution of each object, a sequence of predicted deformation patterns for each object of the plurality of objects over the time duration, and displaying the sequence of predicted deformation patterns for each object of the plurality of objects to the user over the time period. This is advantageous because the method may display a predicted pattern of object deformation over time, where the user can determine if rearrangement of the objects is necessary.

In embodiments, the method may further comprise determining, based on the identified plurality of objects and the load distribution for each object in the first stack formation, a second stack formation that minimizes the deformation of each object of the plurality of objects in relation to the subset of objects of the plurality of objects, generating, using the GAN algorithm, a visualization of the minimized deformation of each object of the plurality objects in the second stack formation, and displaying the visualization of the plurality of objects in the second stack formation to the user. This is advantageous because the method automatically generates a visualization predicting a new stack formation that best prevents deformation of the objects.

In embodiments, the method may further comprise identifying, based on analysis of second image data, that a new object is being added to the plurality of objects that have been configured in the second stack formation by the user, assessing an impact of the new object on the load distribution of each object of the plurality of objects in the second stack formation, determining a position for placement of the new object with the second stack formation, wherein the position for placement of the new object minimizes the deformation of each object in relation to the subset of objects in the second stack formation, generating, using the GAN algorithm, a visualization of the position for placement of the new object within the second stack formation, and displaying the visualization of the position for placement of the new object within the second stack formation. This is advantageous because the method automatically determines where to position new objects that are added to the stack formation based on the predicted load distribution and/or deformation.

In embodiments, generating the visualization depicting deformation of each object of the plurality of objects comprises analyzing packaging specifications of one or more objects of the plurality of objects. This is advantageous because the method may utilize packaging specifications (e.g., type of packaging material, shape, etc.) to make load distribution and/or object deformation predictions based on known attributes (e.g., tensile strength of the package) that are associated with type of package.

In embodiments, determining the load distribution of each object of the plurality of objects is based on a set of object attributes that are associated with a product identification code that was identified via the analysis of the image data. This is advantageous because the method may utilize product identification codes (e.g., bar codes) to make accurate load distribution and/or object deformation predictions based on known attributes (e.g., type of product/object, damageability, etc.) that are associated with type of object.

In embodiments, determining the load distribution of each object of the plurality of objects in relation to a subset of objects of the plurality of objects in the first stack formation includes determining a dynamic load distribution based on movement applied to the first stack formation. This is advantageous because the method may base load distribution predictions on various movements that may occur with the objects due to user interaction (e.g., pushing a shopping cart full of groceries may cause the objects to move).

In embodiments, the image data is generated by an internet of things (IoT) camera. The method utilizes one or more IoT cameras that can be used to generate the images of the given objects.

In embodiments, the visualization depicting the deformation of each object of the plurality of objects is displayed to the user via augmented reality glasses. This is advantageous because the object deformation predictions and/or generated stack formations may be displayed visually to the user via AR glasses. In this way, they can be informed immediately of any potential object deformation as the continue to shop.

According to an aspect of the invention, there is provided a system comprising a processor and a computer-readable storage medium communicatively coupled to the processor and storing program instructions which, when executed by the processor, cause the processor to perform a method. The method performed by the processor comprises: identifying, based on an analysis of image data, a plurality of objects that are in a first stack formation, determining a load distribution of each object of the plurality of objects in relation to a subset of objects of the plurality of objects in the first stack formation, generating, using a generative adversarial network (GAN) algorithm and based on the load distribution for each object, a visualization depicting deformation of each object of the plurality of object in relation to the subset of objects of the plurality of objects in the first stack formation, and displaying the visualization depicting the deformation of each object of the plurality of objects to a user. This is advantageous because the system generates a visualization of predicted object deformation which may be used to notify the user that restacking and/or rearranging of the objects may be necessary. In this way, objects such as groceries, maybe be prevented from damage using the object deformation predictions.

In embodiments, the method performed by the processor of the system may further comprise determining a time period that the plurality of objects will be in the first stack formation, generating, using the GAN algorithm and based on the load distribution of each object, a sequence of predicted deformation patterns for each object of the plurality of objects over the time duration, and displaying the sequence of predicted deformation patterns for each object of the plurality of objects to the user over the time period. This is advantageous because the system may display a predicted pattern of object deformation over time, where the user can determine if rearrangement of the objects is necessary.

In embodiments, the method performed by the processor of the system may further comprise determining, based on the identified plurality of objects and the load distribution for each object in the first stack formation, a second stack formation that minimizes the deformation of each object of the plurality of objects in relation to the subset of objects of the plurality of objects, generating, using the GAN algorithm, a visualization of the minimized deformation of each object of the plurality objects in the second stack formation, and displaying the visualization of the plurality of objects in the second stack formation to the user. This is advantageous because the system automatically generates a visualization predicting a new stack formation that best prevents deformation of the objects.

In embodiments, the method performed by the processor of the system may further comprise identifying, based on analysis of second image data, that a new object is being added to the plurality of objects that have been configured in the second stack formation by the user, assessing an impact of the new object on the load distribution of each object of the plurality of objects in the second stack formation, determining a position for placement of the new object with the second stack formation, wherein the position for placement of the new object minimizes the deformation of each object in relation to the subset of objects in the second stack formation, generating, using the GAN algorithm, a visualization of the position for placement of the new object within the second stack formation, and displaying the visualization of the position for placement of the new object within the second stack formation. This is advantageous because the system automatically determines where to position new objects that are added to the stack formation based on the predicted load distribution and/or deformation.

In embodiments, generating the visualization depicting deformation of each object of the plurality of objects comprises analyzing packaging specifications of one or more objects of the plurality of objects. This is advantageous because the system may utilize packaging specifications (e.g., type of packaging material, shape, etc.) to make load distribution and/or object deformation predictions based on known attributes (e.g., tensile strength of the package) that are associated with type of package.

In embodiments, determining the load distribution of each object of the plurality of objects is based on a set of object attributes that are associated with a product identification code that was identified via the analysis of the image data. This is advantageous because the system may utilize product identification codes (e.g., bar codes) to make accurate load distribution and/or object deformation predictions based on known attributes (e.g., type of product/object, damageability, etc.) that are associated with type of object.

In embodiments, determining the load distribution of each object of the plurality of objects in relation to a subset of objects of the plurality of objects in the first stack formation includes determining a dynamic load distribution based on movement applied to the first stack formation. This is advantageous because the system may base load distribution predictions on various movements that may occur with the objects due to user interaction (e.g., pushing a shopping cart full of groceries may cause the objects to move).

According to an aspect of the invention, there is provided a computer program product comprising a computer-readable storage medium having program instructions embodied therewith, the program instructions executable by a processor to cause the processor to perform a method. The program instructions executable by the processor comprise: identifying, based on an analysis of image data, a plurality of objects that are in a first stack formation, determining a load distribution of each object of the plurality of objects in relation to a subset of objects of the plurality of objects in the first stack formation, generating, using a generative adversarial network (GAN) algorithm and based on the load distribution for each object, a visualization depicting deformation of each object of the plurality of object in relation to the subset of objects of the plurality of objects in the first stack formation, and displaying the visualization depicting the deformation of each object of the plurality of objects to a user. This is advantageous because the computer program product generates a visualization of predicted object deformation which may be used to notify the user that restacking and/or rearranging of the objects may be necessary. In this way, objects such as groceries, maybe be prevented from damage using the object deformation predictions.

In embodiments, the program instructions executable by the processor may further comprise determining a time period that the plurality of objects will be in the first stack formation, generating, using the GAN algorithm and based on the load distribution of each object, a sequence of predicted deformation patterns for each object of the plurality of objects over the time duration, and displaying the sequence of predicted deformation patterns for each object of the plurality of objects to the user over the time period. This is advantageous because the computer program product may display a predicted pattern of object deformation over time, where the user can determine if rearrangement of the objects is necessary.

In embodiments, the program instructions executable by the processor may further comprise determining, based on the identified plurality of objects and the load distribution for each object in the first stack formation, a second stack formation that minimizes the deformation of each object of the plurality of objects in relation to the subset of objects of the plurality of objects, generating, using the GAN algorithm, a visualization of the minimized deformation of each object of the plurality objects in the second stack formation, and displaying the visualization of the plurality of objects in the second stack formation to the user. This is advantageous because the computer program product automatically generates a visualization predicting a new stack formation that best prevents deformation of the objects.

In embodiments, the program instructions executable by the processor may further comprise identifying, based on analysis of second image data, that a new object is being added to the plurality of objects that have been configured in the second stack formation by the user, assessing an impact of the new object on the load distribution of each object of the plurality of objects in the second stack formation, determining a position for placement of the new object with the second stack formation, wherein the position for placement of the new object minimizes the deformation of each object in relation to the subset of objects in the second stack formation, generating, using the GAN algorithm, a visualization of the position for placement of the new object within the second stack formation, and displaying the visualization of the position for placement of the new object within the second stack formation. This is advantageous because the computer program product automatically determines where to position new objects that are added to the stack formation based on the predicted load distribution and/or deformation.

In embodiments, generating the visualization depicting deformation of each object of the plurality of objects comprises analyzing packaging specifications of one or more objects of the plurality of objects. This is advantageous because the computer program product may utilize packaging specifications (e.g., type of packaging material, shape, etc.) to make load distribution and/or object deformation predictions based on known attributes (e.g., tensile strength of the package) that are associated with type of package.

In embodiments, determining the load distribution of each object of the plurality of objects is based on a set of object attributes that are associated with a product identification code that was identified via the analysis of the image data. This is advantageous because the computer program product may utilize product identification codes (e.g., bar codes) to make accurate load distribution and/or object deformation predictions based on known attributes (e.g., type of product/object, damageability, etc.) that are associated with type of object.

In embodiments, determining the load distribution of each object of the plurality of objects in relation to a subset of objects of the plurality of objects in the first stack formation includes determining a dynamic load distribution based on movement applied to the first stack formation. This is advantageous because the computer program product may base load distribution predictions on various movements that may occur with the objects due to user interaction (e.g., pushing a shopping cart full of groceries may cause the objects to move).

In many instances, the stacking of load-bearing objects such as products has led to a significant issue of deformation, encompassing damages, breakage, and compression. This deformation phenomenon occurs when products are subjected to external pressure from stacking loads, The problem is particularly prevalent in scenarios where stacking is a common practice, such as during storage, transportation, and display. The problem of deformation not only leads to financial losses for manufacturers, distributors, and retailers due to damaged goods and decreased market value, but it also impacts consumer satisfaction.

Embodiments of the present disclosure include a method, system, and computer program product that provide for using a GAN model/algorithm to visually generate object deformation predictions. The system will recognize object/product details and stacking sequences within an environment (e.g., shopping cart, container, basket, shelving unit, etc.). By estimating stack load distribution and using the GAN model, the system generates visualizations showing potential deformations on different products on the stack due to stacking, allowing users to rearrange objects pre-emptively. It employs the GAN model to predict deformation patterns considering load and duration, creating animated visualizations for various products over time. Analyzing product lists, the system determines optimal stacking to minimize deformation and uses the GAN model to illustrate potential deformations. As users stack objects, the system assesses new object impact on load distribution and potential deformation. The system also considers packaging, using the GAN model to determine if packaging could deform and affect enclosed products. This comprehensive approach enhances stacking and prevents damage.

In embodiments, as products are stacked, such as in a shopping cart or on shelves, the camera or IoT system integrated into the user's AR glasses recognizes these products along with their specifications and stacking sequence. Subsequently, the proposed system estimates the distribution of the load on various products within the stack. Utilizing the GAN model, the system proactively generates visual representations illustrating potential deformations caused by the load distribution. This enables users to rearrange the products before completing the stacking process, preventing any potential product deformations.

In embodiments, the system factors in the estimated distributed load across various products in the stack and the duration of the applied load. Utilizing the GAN model, the system generates a series of predicted deformation patterns for different products over a specified time frame. These patterns are compiled into an animated visualization, showcasing the progressive deformation of various products influenced by the stack load over the given duration.

In embodiments, the proposed system analyzes a compiled list of products intended for stacking, such as a shopping list or warehouse stacking needs. This analysis considers the objects' specifications and other pertinent factors to determine an optimal stacking arrangement that minimizes product deformation. Using the recommended stacking configurations, the system employs the GAN model to visually depict potential product deformations.

In embodiments, as the user begins stacking products, the system continually assesses the impact of each newly added object on the stack's load distribution. It evaluates how adding each object might affect deformation in other products within the stack. The GAN model is utilized to demonstrate the gradual deformation of products due to the addition of new objects to the trolley or shelves.

In embodiments, the system considers packaging specifications for objects/products enclosed within packages. Utilizing the stack load distribution across various products with packaging, the system determines whether the packaging might be susceptible to deformation due to the load. It also assesses whether the deformed packaging might impact the contained product's integrity.

In embodiments, the system identifies the movement direction of the shopping trolley and predicts potential dynamic loads that may affect various products in the stack. Dynamic loads from movement on slopes or bumpy surfaces are analyzed for their impact on product deformation. When generating GAN-based predictions, the system considers the types and durations of these dynamic loads on different products.

In embodiments, communication between shopping carts/trolleys on the floor allows the sharing of movement patterns, dynamic load information, and relative positions. The system predicts the mobility path of the trolley based on these inputs and proactively illustrates potential deformations that may occur due to the anticipated dynamic load paths.

In the realm of physical shopping, where customers navigate aisles and fill their carts, a significant challenge is ensuring the safety and condition of stacked products. This innovative concept aims to transform the shopping experience by offering predictive visualizations of potential product deformations when stacking objects in a physical cart.

By leveraging predictive technology, shoppers gain insights, strategically organize their purchases, and visualize the potential consequences of their stacking choices. This empowers shoppers to optimize their cart organization, preserving the quality and integrity of their selected objects throughout their shopping journey.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example object deformation analysis system 100, in accordance with embodiments of the present disclosure. In the illustrated embodiment, object deformation analysis system 100 includes object deformation analysis device 102 that is communicatively coupled to augmented reality (AR) device 120 and Internet of Things (IoT) device 130 via network 150. Object deformation analysis device 102, AR device 120, and IoT device 130 may be configured as any type of computer system and may be substantially similar to computer system 601 detailed in FIG. 6. In embodiments, AR device 120 may include a camera 122, that generates image data 126 of objects to be analyzed for deformation and/or load distribution within a given environment. The AR device 120 may include display 124 where various image data (e.g., visualization of the objects, new staking formation, and/or object deformation simulations) may be presented to a user.

Network 150 may be any type of communication network, such as a wireless network or a cloud computing network. Network 150 may be substantially similar to, or the same as, a computing environment 700 described in FIG. 7. In some embodiments, network 150 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over network 150.

In the illustrated embodiment, object deformation analysis device 102 includes network interface (I/F) 104, processor 106, memory 108, object detection component 110, deep neural network model (DNN) 112, generative adversarial network (cGAN) model 114, visual component 116, and object corpus 118.

In embodiments, the object detection component 110 is designed to discern and classify multiple objects within the image data 126 received from the AR device 120. Image data 126 might be sourced from an IoT device, such as IoT device 130 functioning as an additional camera in the environment, capturing imagery of various objects. This component leverages the You Only Look Once (YOLO) image detection and recognition algorithms to identify diverse objects within the image data 126. YOLO's methodology involves breaking down an image into a grid, enabling the prediction of bounding boxes and object classes in a single pass, ensuring rapid and efficient detection. Employing anchor boxes for predicting object sizes, coupled with convolutional neural networks processing image features, YOLO employs non-maximum suppression to refine predictions, making it suitable for real-time applications in image and video analysis. Its unique approach significantly advances object detection capabilities.

In embodiments, the object detection component 110 scans the contents of an environment or container (e.g., a shopping cart), discerning and categorizing the stacked objects within. Utilizing advanced image analysis techniques like YOLO, this component accurately identifies each object and determines their spatial relationships within the environment. Upon object identification, the component interacts with the object corpus 130 (e.g., store's database), further categorizing the objects based on known attributes obtained from the object corpus 118. These attributes encompass various details, including product type, unique packaging, weight, and dimensions.

In embodiments, the DNN model 112 is tailored to compute the center of mass position for the identified stacked objects (e.g., products within a shopping cart). It generates a numerical representation pinpointing the location along the cart's length where the combined weight of the products achieves perfect balance. This load distribution metric indicates the position of the products' center of mass in the cart, providing insights into potential imbalances. By furnishing a specific load distribution metric like the center of mass position, the DNN model 112 quantitatively illustrates how the weight of each object is distributed in the environment (e.g., shopping cart) and may employ a convolutional neural network architecture.

In embodiments, the GAN model 114 leverages the predicted center of mass value, signifying cart balance, along with real-time image data 126 of the analyzed object stacking. These combined inputs serve as conditions for the GAN model 114. It utilizes these conditions to generate a visual representation illustrating the distribution of the load within the environment (e.g., shopping cart). The GAN model's output furnishes a tangible depiction of the spatial arrangement of objects, augmenting the shopping experience by providing informative insights into load balance. In embodiments, visual component 116 may use the GAN model 114 output and generate one or more visualizations that may be present to the user via AR device 120. The visualizations may incorporate any potential product deformities into the generated visual, offering a comprehensive perspective. This fusion of sophisticated conditions and intricate neural processing enriches the shopping experience with detailed insights into both load distribution and potential anomalies.

In some embodiments, the object deformation analysis device 102 may use machine learning to continuously run rounds of experiments to generate additional useful training data. For example, when a new set of inputs (such as new data inputs collected/received after implementing the optimized training solutions on the current state of the system 100) are presented to the machine learning model, it may prescribe training types based on the past actions for similar inputs. As the training data expands, the machine learning model is periodically retrained and/or refactored, resulting in increasingly accurate predictions of valid configuration parameter values that are likely to affect performance metrics of the GAN model based on predicted changes in object deformation patterns. The results from prior experimentation are used to determine configuration and/or workload attribute variations and/or training type selections from which to gather data for future experiments. For example, using machine learning may identify one or more experimental values for one or more configuration parameters based on determining that historical changes to the one or more object deformation patterns that had an impact on one or more performance metrics that is over a threshold amount of change. For example, the machine learning model may identify historical changes for object deformation patterns/parameters based on given training selection and optimize such parameters over time.

A machine learning model is trained using a particular machine learning algorithm. Once trained, input is applied to the machine learning model to make a prediction, which may also be referred to herein as a predicated output or output. A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process, such as object deformation analysis device 102, executing a machine learning algorithm applies the model artifact against the input to generate a predicted output. A computer system process executes a machine learning algorithm by executing software configured to cause execution of the algorithm.

In some embodiments, feature synthesis may be performed. Feature synthesis is the process of transforming raw input into features that may be used as input to a machine learning model. Feature synthesis may also transform other features into input features. Feature engineering refers to the process of identifying features. A goal of feature engineering is to identify a feature set with higher feature predicative quality for a machine learning algorithm or model. Features with higher predicative quality cause machine learning algorithms and models to yield more accurate predictions. In addition, a feature set with high predicative quality tends to be smaller and require less memory and storage to store. A feature set with higher predicative quality also enables generation of machine learning models that have less complexity and smaller artifacts, thereby reducing training time and execution time when executing a machine learning model. Smaller artifacts also require less memory and/or storage to store.

In some embodiments, object deformation analysis device 102 can utilize machine learning and/or deep learning, where algorithms or models can be generated by performing supervised, unsupervised, or semi-supervised training on historical data inputs and/or historical features. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of object deformation analysis system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with object deformation analysis system 100 may not be present, and the arrangement of components may vary. For example, while FIG. 1 illustrates an example object deformation analysis system 100 having a single object deformation analysis device 102, a single AR device 120, and a single IoT device 130 that are communicatively coupled via a single network 150, suitable network architectures for implementing embodiments of this disclosure may include any number of object deformation analysis devices, AR devices, IoT devices, and networks. The various models, modules, systems, and components illustrated in FIG. 1 may exist, if at all, across a plurality of object deformation analysis devices, AR devices, IoT devices, and networks.

Figures 2A, 2B:
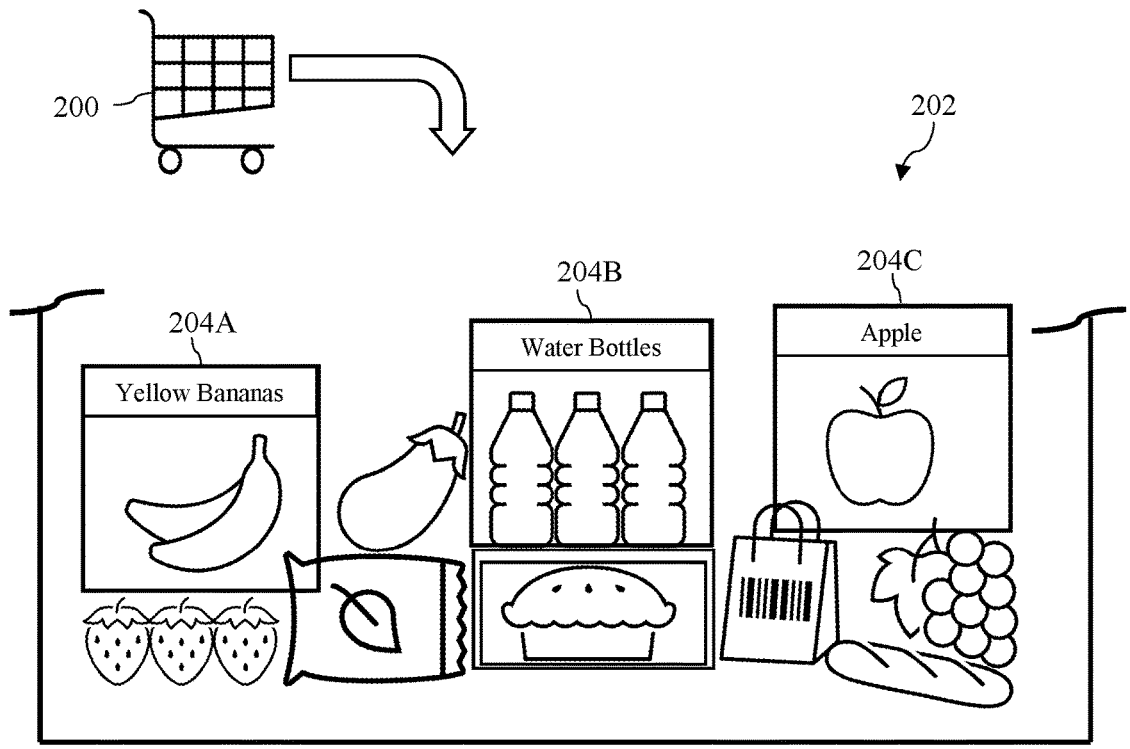
FIG. 2A illustrates an example diagram of a plurality of objects stacked within a shopping cart, in accordance with embodiments of the present disclosure.
FIG. 2B illustrates an example attribute table associated with the identified objects, in accordance with embodiments of the present disclosure.

Referring now to FIG. 2A, shown is an example diagram 202 of a plurality of objects 204 within a shopping cart 200, in accordance with embodiments of the present disclosure.

It is important to note that this represents just one instance of analyzing and predicting object deformation in the context of grocery shopping, and should not be seen as limiting. When a user embarks on their shopping journey, it typically begins with selecting the plurality of objects 204 from the store's array of offerings. In this depicted scenario, the system, such as the object deformation analysis system 100, employs automated product detection and position recognition algorithms to identify the plurality of objects 204 within the shopping cart 200, as illustrated in the shopping basket diagram 202.

In certain implementations, this system may leverage YOLO (You Only Look Once) object detection algorithms, an innovative architecture in computer vision. YOLO functions by dividing an image into a grid and predicting bounding boxes and object classes simultaneously, ensuring rapidity and efficiency. The figure displays bounding boxes around objects 204A, 204B, and 204C. Predicting object sizes is aided by anchor boxes, while convolutional neural networks process image features. YOLO also utilizes non-maximum suppression to refine predictions, making it apt for real-time applications like image and video analysis. Its unique approach of a single-pass and grid-based methodology has significantly elevated object detection capabilities.

In these embodiments, the system scrutinizes the contents of the shopping cart 200, identifying and acknowledging the pre-stacked objects 204. Through sophisticated image analysis utilizing YOLO, each object is accurately recognized, and their relative positions within the cart are determined. This automated process not only bolsters efficiency but also sets the groundwork for optimizing the arrangement of objects based on the existing configuration, ensuring a harmonious and well-organized layout. YOLO's computational prowess culminates in a comprehensive and comprehensible portrayal of the cart's contents, visually presenting bounding boxes delineating each detected object. These boxes, complemented by labels, distinctly identify the recognized objects or products, providing users with a clear overview of their current shopping cart composition.

Referring now to FIG. 2B, shown is an example attribute table 206 associated with the identified objects, in accordance with embodiments of the present disclosure. In embodiments, once the objects are identified using automated product detection and position recognition algorithms (e.g., YOLO), the system may interact with a database to classify the identified objects based on known attributes. For example, the system may access a grocery store database that includes details about each of the identified objects or products, including their unique packaging, weight, and dimensions. Using these attributes, the system can generate an attribute table 206 that classifies the identified objects. For example, the object's product type, weight, type, package type, and strength attributes may be listed in the table. The system may analyze these attributes when generating object deformation predictions. For example, an object that has no packaging material and a strength type that is "easily damaged", such as the bread, are prone to deformation. Whereas an object that is packaged and not easily damaged, such as the water bottles, is deformation resistant. Using these attributes, the system may accurately determine and generate various visualizations related to object deformation predictions.

Figure 3:
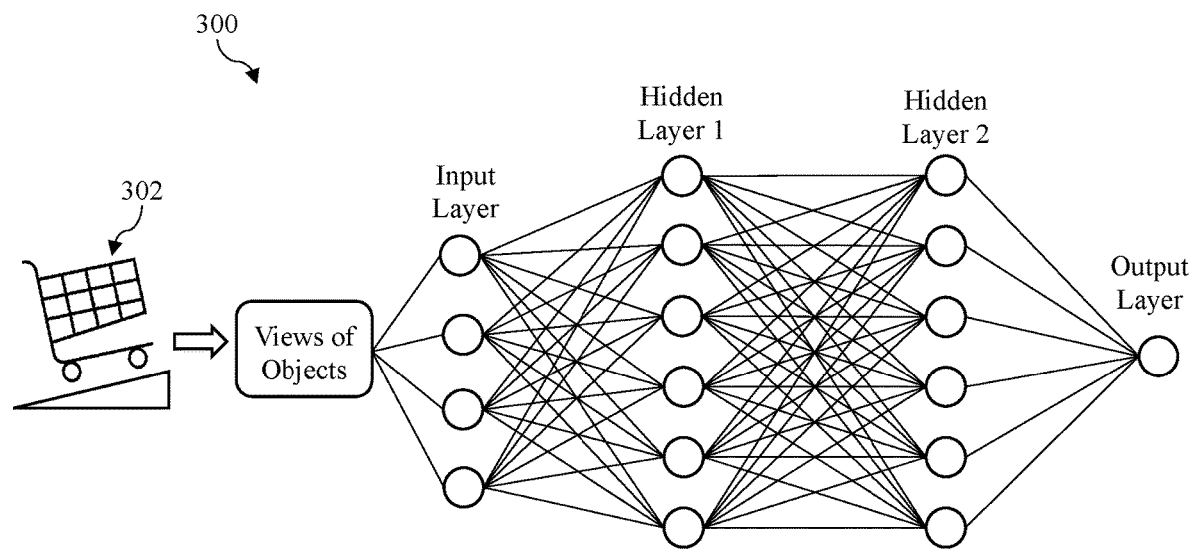
FIG. 3 illustrates an example diagram for determining load distribution using a deep neural network model, in accordance with embodiments of the present disclosure.

Referring now to FIG. 3, shown is an example diagram for determining load distribution using a deep neural network (DNN) model 300, in accordance with embodiments of the present disclosure. In embodiments, the deep neural network 300 calculates the center of mass position for the plurality of objects in the shopping cart 302. In embodiments, the DNN 300 may account for various angles (e.g., slope of the ground, tilt of the cart, etc.) of the shopping cart 302 and/or positions of the objects (based on various view of the objects) when determining load distribution. The DNN 300 outputs a numerical value that represents the location along the length of the shopping cart 302 where the combined weight of the objects is perfectly balanced. This load distribution metric indicates that the center of mass of the objects/products in the shopping cart is closer to the back of the cart, which might make the cart slightly imbalanced. By providing a specific load distribution metric like the center of mass position, the DNN 300 offers a quantitative insight into how the weight is distributed in the shopping cart 302. This information helps users make informed decisions about how to arrange the products for better stability and balance during transportation. It serves as a guideline for optimizing the arrangement of objects to ensure a safer and more stable shopping cart 302 configuration.

In some embodiments, the DNN 300 may be a Convolutional Neural Network (CNN) that typically consists of several layers that work collaboratively to process and analyze visual data. The initial layer, known as the input layer, receives the raw image data. Convolutional layers perform feature extraction by convolving learned filters across the input, capturing different patterns. Activation functions introduce non-linearity, enhancing the network's ability to model complex relationships. Pooling layers down sample the extracted features, reducing computational complexity and enhancing robustness. Fully connected layers at the end of the network integrate extracted features for final predictions, making CNNs a potent tool for image recognition and analysis. In our scenario it predicts the load distribution metric: center of mass value.

Figure 4:
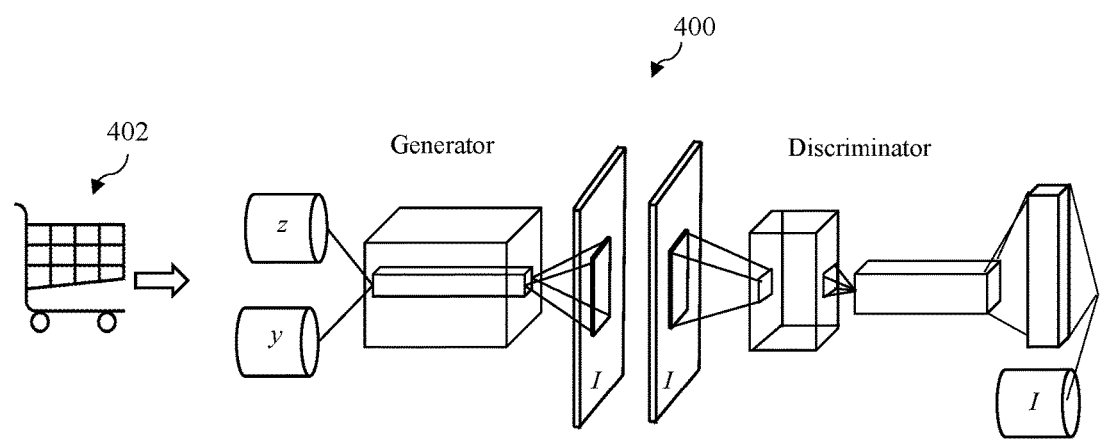
FIG. 4 illustrates an example diagram for predicting object deformation using a Conditional Generative Adversarial Network (cGAN) model, in accordance with embodiments of the present disclosure.

Referring now to FIG. 4, shown is an example diagram for predicting object deformation using a Generative Adversarial Network (GAN) model 400, in accordance with embodiments of the present disclosure. In some embodiments, the GAN model 400 may be a conditional GAN model. In embodiments, the GAN model 400 is applied to the output of FIG. 3 to generate a load distribution visualization. The predicted center of mass value, indicating shopping cart 402 balance, is coupled with the real-time image data of the object stacking/configuration/arrangement within the cart. These combined inputs serve as conditions for the GAN model 400. This network then utilizes these conditions to generate a visual representation of how the load is distributed within the shopping cart 402. The GAN model's output provides a tangible illustration of the spatial arrangement of objects, enhancing the shopping experience with informative insights into load balance. It incorporates any potential product deformities into the generated visual, offering an all-encompassing perspective. This fusion of sophisticated conditions and intricate neural processing provides a comprehensive view, enriching the shopping experience with detailed insights into both load distribution and potential anomalies.

In the illustrated embodiment, GAN model 400 is a sophisticated machine learning architecture designed for generating data based on specific conditions. The GAN model 400 comprises two key components—a generator and a discriminator—the GAN engages in a game-like dynamic. The generator takes random noise and conditions (such as predicted load distribution) to create data that resembles a desired output (like a visual representation of stack load distribution). Meanwhile, the discriminator evaluates the generated data against real time data, fostering a competitive learning process. This adversarial interplay results in a generator that becomes adept at producing highly realistic outputs, making the GAN model 400 a potent tool for data generation tasks under specified conditions. In this way, the GAN model is configured to generate the shopping cart visualization which may be displayed to the user via one or more display devices (e.g., AR glasses, computer screen, etc.).

In some embodiments, the GAN model 400 may include GAN-Enhanced Cart Regeneration with Visual and Heat Map Insights. This versatile system undertakes a dual role in cart regeneration. In embodiments, the GAN model 400 employs its capabilities to generate a visually augmented shopping cart. In embodiments, the GAN model 400 may generate graphical overlays, that intricately display a visualization of the stack load distribution of objects, painting a vivid picture of how various objects are arranged. This visual enhancement offers users a tangible understanding of load distribution within the cart.

In some embodiments, the GAN model 400 may generate a heat map representation of the stack load distribution. The dynamic heat map may display a visualization of the intensity of load across different regions to the user, providing a comprehensive and intuitive insight into potential pressure points and load concentration. In this way, the GAN model's ingenious interplay of visuals and heat maps enhances cart regeneration, enabling users to gain a multifaceted understanding of load distribution. This symbiotic relationship between the GAN model's creative generation and the cart's reconfiguration adds a layer of informative depth to the shopping experience.

In this way, the user may make object stacking and/or arrangement decisions, armed with load distribution insights. After viewing both visual and heat map representations, the user may understand the shopping cart's load dynamics. With this understanding, the user can proactively choose any product for potential repositioning. This choice empowers the user to fine-tune load balance and optimize space utilization, creating a personalized and well-organized cart arrangement. This user-driven interaction, influenced by data-driven insights, harmonizes technology and user agency, enhancing the overall shopping experience.

Figure 5A:
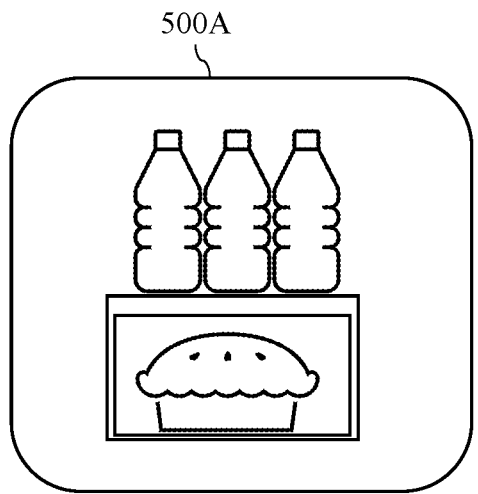
FIG. 5A illustrates an example first stack formation, in accordance with embodiments of the present disclosure.

Referring now to FIG. 5A, shown is an example first stack formation 500A, in accordance with embodiments of the present disclosure. In the illustrated embodiment, image data representing the first stack formation 500A includes a pack of water bottles that are placed on top of a packaged apple pie. Using the attributes table 206 from FIG. 2B, the system may identify by analyzing the image data that the packaged apple pie is packaged in a thin box that is easily damaged. Further, based on the weight of the water bottles, the system may determine that the packaged apple pie will experience deformation (as shown in FIG. 5B) from the water bottles if left in this first stack formation.

Figure 5B:
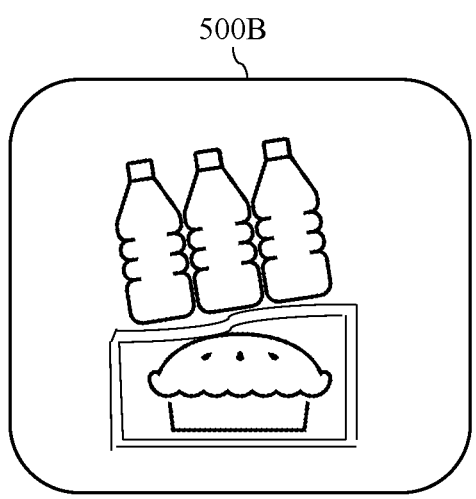
FIG. 5B illustrates an example of predicted object deformation, in accordance with embodiments of the present disclosure.

Referring now to FIG. 5B, shown is an example of object deformation 500B, in accordance with embodiments of the present disclosure. In embodiments, the system may generate a visualization of the objects based on the predicated deformation. As shown, the system generates a visualization depicting deformation of the package of the apple pie due to the weight of the water bottles. This visualization may be displayed to the user via AR glasses or some other display type (e.g., computer screen).

Figure 5C:
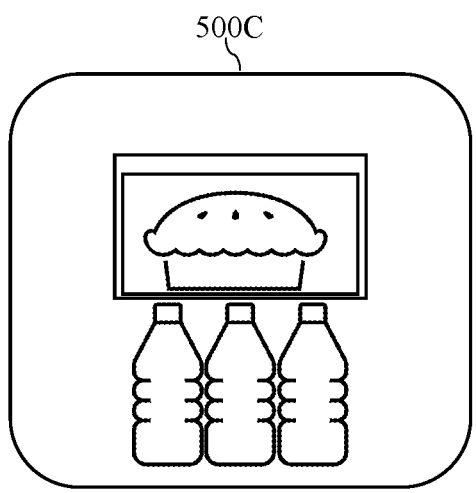
FIG. 5C illustrates an example of a predicted second stack formation, in accordance with embodiments of the present disclosure.

Referring now to FIG. 5C, shown is an example of a predicted second stack formation 500C, in accordance with embodiments of the present disclosure. In embodiments, the system may generate a visualization of a second stack formation 500C which minimizes deformation of the given objects. As shown, the system rearranges the objects by having the easily damaged apple pie placed on top of the heavier water bottles as shown in the second stack formation 500C. The second stack formation may be shown in a visualization that is displayed to the user. In this way, the system may predict a better stack formation that may be used or implemented by the suer to reduce any deformation of the given objects.

Figure 6:
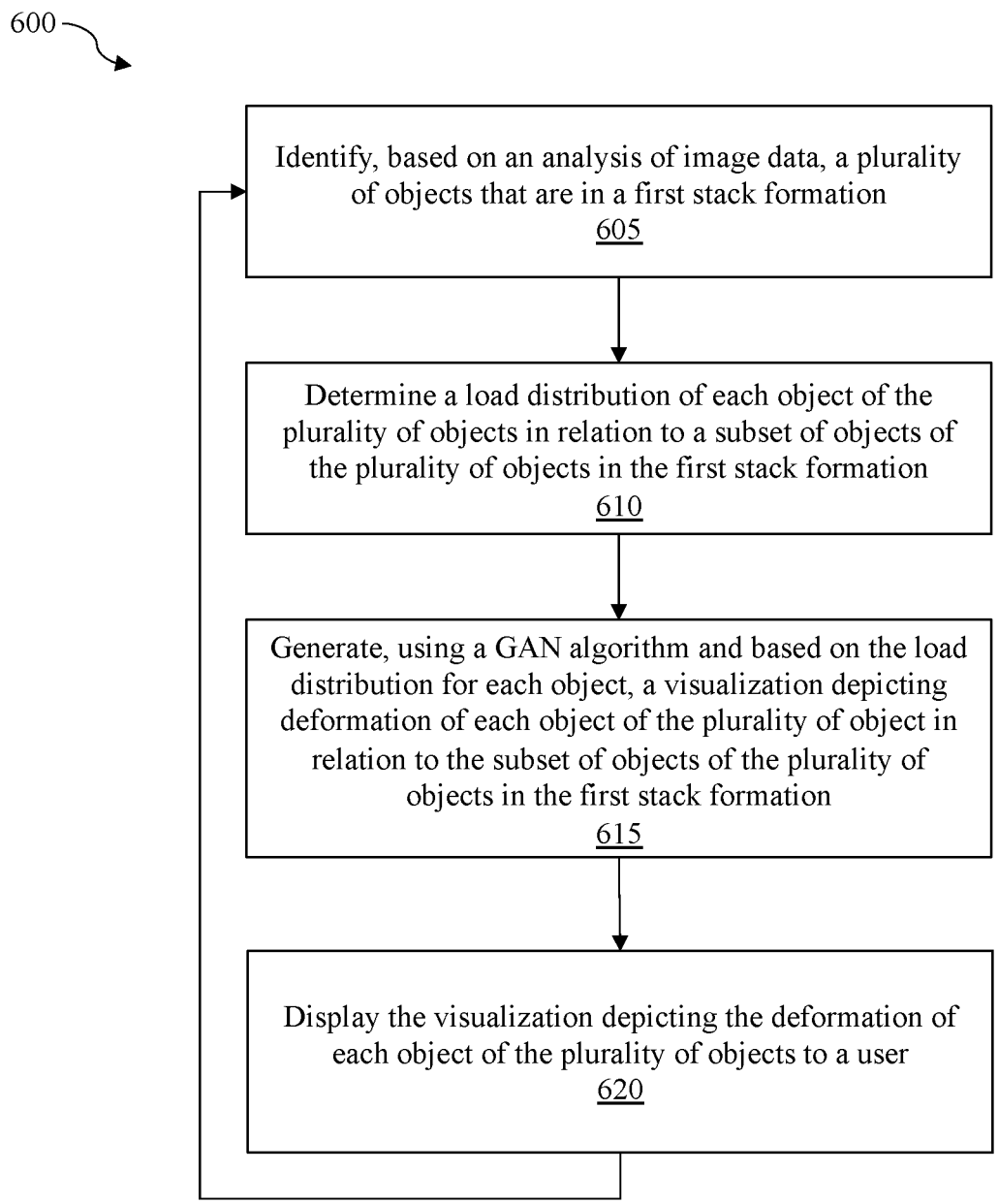
FIG. 6 illustrates a flow diagram of an example process for generating object deformation predictions using a GAN model, in accordance with some embodiments of the present disclosure.

Referring now to FIG. 6, shown is an example process 600 for generating object deformation predictions using a GAN model, in accordance with some embodiments of the present disclosure. The process 600 may be performed by processing logic that comprises hardware (e.g., circuitry, dedicated logic, programmable logic, microcode, etc.), software (e.g., instructions run on a processor), firmware, or a combination thereof. In some embodiments, the process 600 is a computer-implemented process. In embodiments, the process 600 may be performed by processor 106 of object analysis device 102 exemplified in FIG. 1.

In embodiments, the proposed system will estimate stack load distribution on different objects or products based on their specifications and the subsequent objects to be placed on the stack. The system will utilize AR glasses or a display system to illustrate how various objects/products might deform due to the applied stack load, invention will use GAN to create a visualization on how the products will be deformed due to stack load distribution, so that user can proactively take action to prevent deformation of the products.

In embodiments, the process 600 begins by identifying, based on an analysis of image data, a plurality of objects that are in a first stack formation. This is illustrated at step 505. In embodiments, the image data is generated by an internet of things (IoT) camera.

The process 600 continues by determining a load distribution of each object of the plurality of objects in relation to a subset of objects of the plurality of objects in the first stack formation. This is illustrated at step 610.

In some embodiments, determining the load distribution of each object of the plurality of objects is based on a set of object attributes that are associated with a product identification code that was identified via the analysis of the image data.

In some embodiments, determining the load distribution of each object of the plurality of objects in relation to a subset of objects of the plurality of objects in the first stack formation includes determining a dynamic load distribution based on movement applied to the first stack formation.

The process 600 continues by generating, using a generative adversarial network (GAN) algorithm and based on the load distribution for each object, a visualization depicting deformation of each object of the plurality of object in relation to the subset of objects of the plurality of objects in the first stack formation. This is illustrated at step 615. In some embodiments, generating the visualization depicting deformation of each object of the plurality of objects comprises analyzing packaging specifications of one or more objects of the plurality of objects.

The process 600 continues by displaying the visualization depicting the deformation of each object of the plurality of objects to a user. This is illustrated at step 620. In some embodiments, the visualization depicting the deformation of each object of the plurality of objects is displayed to the user via augmented reality glasses.

In some embodiments, the process 600 may include determining a time period that the plurality of objects will be in the first stack formation; generating, using the GAN algorithm and based on the load distribution of each object, a sequence of predicted deformation patterns for each object of the plurality of objects over the time duration; and displaying the sequence of predicated deformation patterns for each object of the plurality of objects to the user over the time period.

In some embodiments, the process 600 may include determining, based on the identified plurality of objects and the load distribution for each object in the first stack formation, a second stack formation that minimizes the deformation of each object of the plurality of objects in relation to the subset of objects of the plurality of objects; generating, using the GAN algorithm, a visualization of the minimized deformation of each object of the plurality objects in the second stack formation; and displaying the visualization of the plurality of objects in the second stack formation to the user.

Once the object deformation predictions are made, users are empowered to take action based on the provided suggestion. Armed with the precise guidance from the neural network, they have the autonomy to re-arrange products within the cart. This interactive process allows users to apply the suggested adjustments, optimizing load distribution and maximizing space efficiency. By seamlessly translating predictive insights into actionable changes, users actively participate in fine-tuning their cart arrangement. This dynamic collaboration between technology-driven suggestions and user-driven adjustments culminates in an enhanced shopping experience, reflecting a harmonious fusion of intelligent guidance and individual choice.

In some embodiments, the process 600 may include identifying, based on analysis of second image data, that a new object is being added to the plurality of objects that have been configured in the second stack formation by the user; assessing an impact of the new object on the load distribution of each object of the plurality of objects in the second stack formation; determining a position for placement of the new object with the second stack formation, wherein the position for placement of the new object minimizes the deformation of each object in relation to the subset of objects in the second stack formation; generating, using the GAN algorithm, a visualization of the position for placement of the new object within the second stack formation; and displaying the visualization of the position for placement of the new object within the second stack formation.

In this way, a sophisticated deep neural network assumes the role of a predictive guide, offering precise guidance for re-arranging selected products within the cart. Drawing upon its advanced pattern recognition capabilities, this neural network accurately predicts the bounding box coordinates of an ideal location within the cart for the chosen product's repositioning. This predictive insight aids users in making informed decisions, ensuring meticulous adjustments that optimize load distribution and spatial utilization. By seamlessly merging advanced technology with user interaction, this neural network enhances the shopping experience through tailored and efficient product arrangement.

The system utilizes smart technology with user involvement to create a better shopping cart experience. By using advanced systems like Convolutional Neural Networks and Generative Adversarial Networks, we show users how products are stacked and suggest changes for better balance. Users can see load details, adjust product positions, and make the cart more efficient. This collaboration between technology and user input aims to improve cart balance, protect products, and let users shop smarter.

Figure 7:
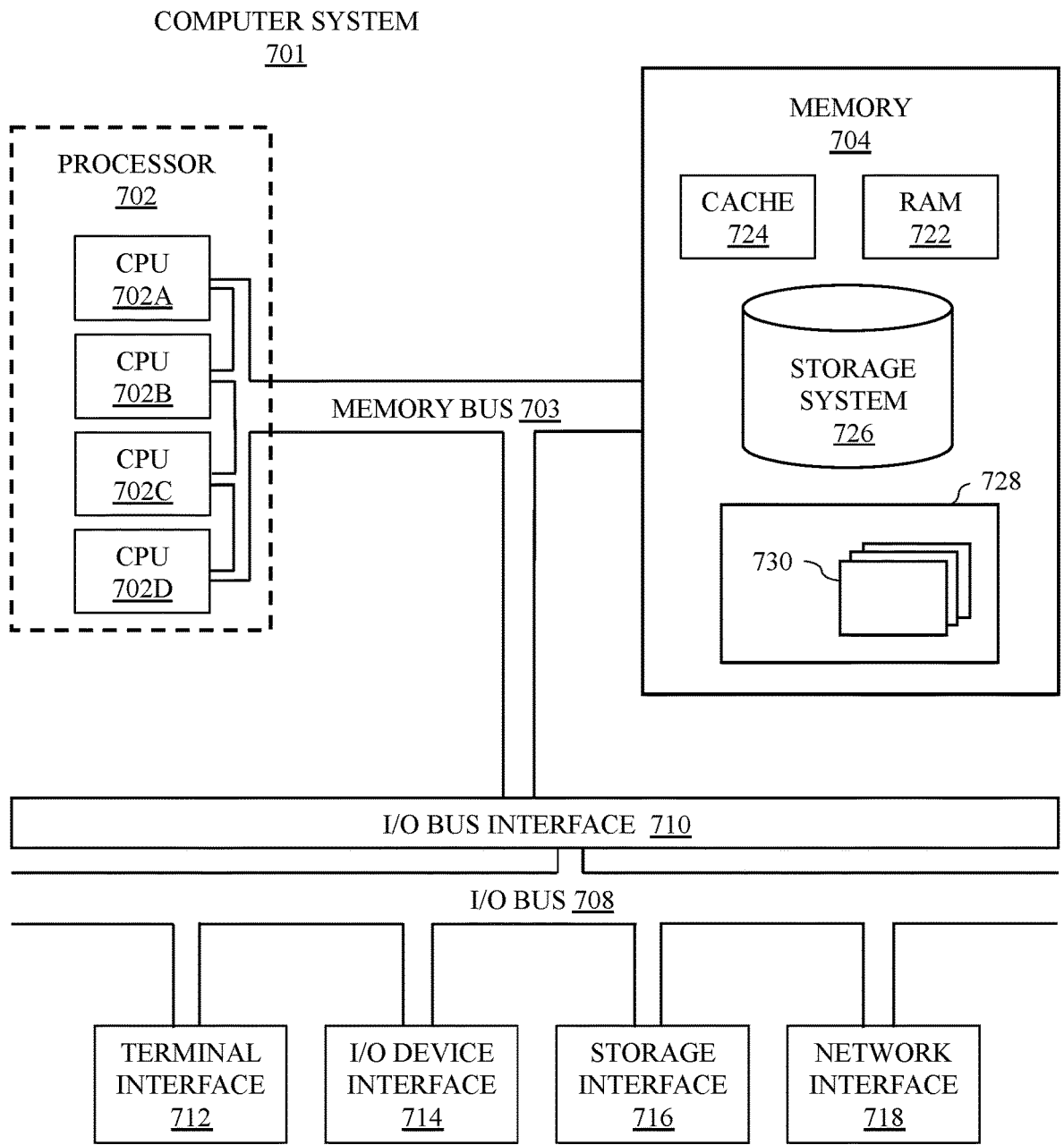
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache. In some embodiments, a processor can include at least one or more of, a memory controller, and/or storage controller. In some embodiments, the CPU can execute the processes included herein (e.g., process 600 as described in FIG. 6). In some embodiments, the computer system 701 may be configured as object deformation analysis system 100 of FIG. 1.

System memory subsystem 704 may include computer system readable media in the form of volatile memory, such as random-access memory (RAM) 722 or cache memory 724. Computer system 701 may further include other removable/non-removable, volatile/non-volatile computer system data storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 704 can include flash memory, e.g., a flash memory stick drive or a flash drive. Memory devices can be connected to memory bus 703 by one or more data media interfaces. The memory subsystem 704 may include at least one program product having a set (e.g., at least one) of program modules that are configured to carry out the functions of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single units, the computer system 701 may, in some embodiments, contain multiple I/O bus interfaces 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

One or more programs/utilities 728, each having at least one set of program modules 730 may be stored in memory subsystem 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment.

Programs/utilities 728 and/or program modules 730 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pitslands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Figure 8:
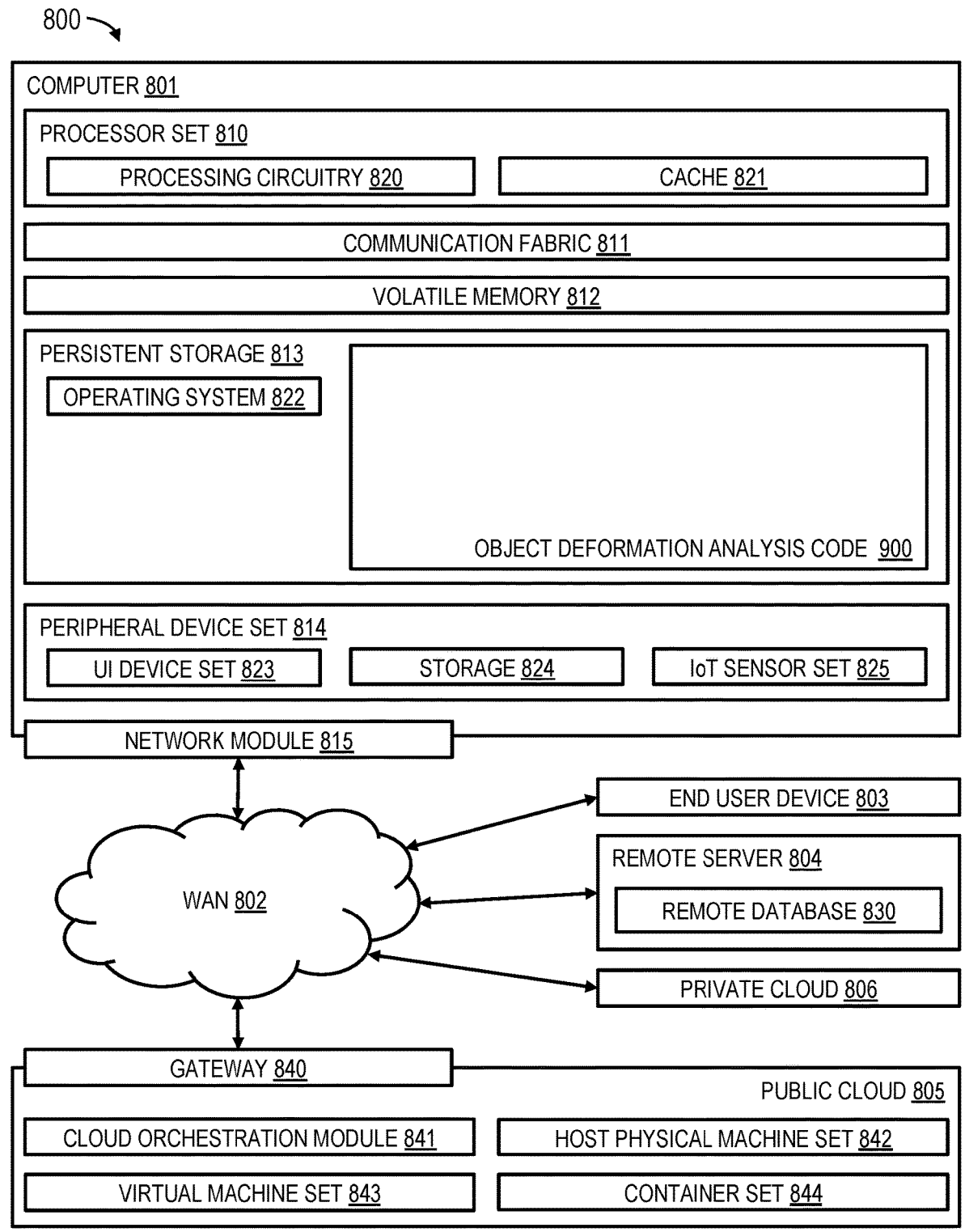
FIG. 8 depicts a schematic diagram of a computing environment for executing program code related to the methods disclosed herein and for predicting object deformation according to at least one embodiment.

Embodiments of the present disclosure may be implemented together with virtually any type of computer, regardless of the platform is suitable for storing and/or executing program code. FIG. 8 shows, as an example, a computing environment 800 (e.g., cloud computing system) suitable for executing program code related to the methods disclosed herein and for object deformation analysis and management. In some embodiments, the computing environment 800 may be the same as or an implementation of the computing environment 100.

Computing environment 800 contains an example of an environment for the execution of at least some of the computer code involved in performing the inventive methods, such as object deformation analysis code 900. The object deformation analysis code 900 may be a code-based implementation of the autonomous vehicle management system 100. In addition to object deformation analysis code 900, computing environment 800 includes, for example, a computer 801, a wide area network (WAN) 802, an end user device (EUD) 803, a remote server 804, a public cloud 805, and a private cloud 806. In this embodiment, the computer 801 includes a processor set 810 (including processing circuitry 820 and a cache 821), a communication fabric 811, a volatile memory 812, a persistent storage 813 (including operating a system 822 and the object deformation analysis code 900, as identified above), a peripheral device set 814 (including a user interface (UI) device set 823, storage 824, and an Internet of Things (IoT) sensor set 825), and a network module 815. The remote server 804 includes a remote database 830. The public cloud 805 includes a gateway 840, a cloud orchestration module 841, a host physical machine set 842, a virtual machine set 843, and a container set 844.

The computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 830. As is well understood in the art of computer technology, and depending upon the technology, performance of a computer-implemented method may be distributed among multiple computers and/or between multiple locations. On the other hand, in this presentation of the computing environment 800, detailed discussion is focused on a single computer, specifically the computer 801, to keep the presentation as simple as possible. The computer 801 may be located in a cloud, even though it is not shown in a cloud in FIG. 1. On the other hand, the computer 801 is not required to be in a cloud except to any extent as may be affirmatively indicated.

The processor set 810 includes one, or more, computer processors of any type now known or to be developed in the future. The processing circuitry 820 may be distributed over multiple packages, for example, multiple, coordinated integrated circuit chips. The processing circuitry 820 may implement multiple processor threads and/or multiple processor cores. The cache 821 is memory that is located in the processor chip package(s) and is typically used for data or code that should be available for rapid access by the threads or cores running on the processor set 810. Cache memories are typically organized into multiple levels depending upon relative proximity to the processing circuitry. Alternatively, some, or all, of the cache for the processor set may be located "off chip." In some computing environments, the processor set 810 may be designed for working with qubits and performing quantum computing.

Computer readable program instructions are typically loaded onto the computer 801 to cause a series of operational steps to be performed by the processor set 810 of the computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 821 and the other storage media discussed below. The program instructions, and associated data, are accessed by the processor set 810 to control and direct performance of the inventive methods. In the computing environment 800, at least some of the instructions for performing the inventive methods may be stored in the object deformation analysis code 900 in the persistent storage 813.

The communication fabric 811 is the signal conduction path that allows the various components of the computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 812 is any type of volatile memory now known or to be developed in the future. Examples include dynamic type random access memory (RAM) or static type RAM. Typically, the volatile memory 812 is characterized by random access, but this is not required unless affirmatively indicated. In the computer 801, the volatile memory 812 is located in a single package and is internal to the computer 801, but, alternatively or additionally, the volatile memory may be distributed over multiple packages and/or located externally with respect to the computer 801.

The persistent storage 813 is any form of non-volatile storage for computers that is now known or to be developed in the future. The non-volatility of this storage means that the stored data is maintained regardless of whether power is being supplied to the computer 801 and/or directly to the persistent storage 813. The persistent storage 813 may be a read only memory (ROM), but typically at least a portion of the persistent storage allows writing of data, deletion of data and re-writing of data. Some familiar forms of persistent storage include magnetic disks and solid state storage devices. The operating system 822 may take several forms, such as various known proprietary operating systems or open source Portable Operating System Interface-type operating systems that employ a kernel. The code included in the object deformation analysis code 900 typically includes at least some of the computer code involved in performing the inventive methods.

The peripheral device set 814 includes the set of peripheral devices of the computer 801. Data communication connections between the peripheral devices and the other components of the computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 823 may include components such as a display screen, speaker, microphone, wearable devices (such as goggles and smart watches), keyboard, mouse, printer, touchpad, game controllers, and haptic devices. The storage 824 is external storage, such as an external hard drive, or insertable storage, such as an SD card. The storage 824 may be persistent and/or volatile. In some embodiments, the storage 824 may take the form of a quantum computing storage device for storing data in the form of qubits. In embodiments where the computer 801 is required to have a large amount of storage (for example, where the computer 801 locally stores and manages a large database) then this storage may be provided by peripheral storage devices designed for storing very large amounts of data, such as a storage area network (SAN) that is shared by multiple, geographically distributed computers. The IoT sensor set 825 is made up of sensors that can be used in Internet of Things applications. For example, one sensor may be a thermometer and another sensor may be a motion detector.

The network module 815 is the collection of computer software, hardware, and firmware that allows the computer 801 to communicate with other computers through the WAN 802. The network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 815 are performed on the same physical hardware device. In other embodiments (for example, embodiments that utilize software-defined networking (SDN)), the control functions and the forwarding functions of the network module 815 are performed on physically separate devices, such that the control functions manage several different network hardware devices. Computer readable program instructions for performing the inventive methods can typically be downloaded to the computer 801 from an external computer or external storage device through a network adapter card or network interface included in the network module 815.

The WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 803 is any computer system that is used and controlled by an end user (for example, a customer of an enterprise that operates the computer 801) and may take any of the forms discussed above in connection with the computer 801. The EUD 803 typically receives helpful and useful data from the operations of the computer 801. For example, in a hypothetical case where the computer 801 is designed to provide a recommendation to an end user, this recommendation would typically be communicated from the network module 815 of the computer 801 through the WAN 802 to the EUD 803. In this way, the EUD 803 can display, or otherwise present, the recommendation to an end user. In some embodiments, the EUD 803 may be a client device, such as thin client, heavy client, mainframe computer, desktop computer and so on.

The remote server 804 is any computer system that serves at least some data and/or functionality to the computer 801. The remote server 804 may be controlled and used by the same entity that operates computer 801. The remote server 804 represents the machine(s) that collect and store helpful and useful data for use by other computers, such as the computer 801. For example, in a hypothetical case where the computer 801 is designed and programmed to provide a recommendation based on historical data, then this historical data may be provided to the computer 801 from the remote database 830 of the remote server 804.

The public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of the public cloud 805 is performed by the computer hardware and/or software of the cloud orchestration module 841. The computing resources provided by the public cloud 805 are typically implemented by virtual computing environments that run on various computers making up the computers of the host physical machine set 842, which is the universe of physical computers in and/or available to the public cloud 805. The virtual computing environments (VCEs) typically take the form of virtual machines from the virtual machine set 843 and/or containers from the container set 844. It is understood that these VCEs may be stored as images and may be transferred among and between the various physical machine hosts, either as images or after instantiation of the VCE. The cloud orchestration module 841 manages the transfer and storage of images, deploys new instantiations of VCEs and manages active instantiations of VCE deployments. The gateway 840 is the collection of computer software, hardware, and firmware that allows the public cloud 805 to communicate through the WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 806 is similar to the public cloud 805, except that the computing resources are only available for use by a single enterprise. While the private cloud 806 is depicted as being in communication with the WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 805 and the private cloud 806 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. In some embodiments, one or more of the operating system 822 and the object deformation analysis code 900 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, based on an analysis of image data, a plurality of objects that are in a first stack formation;
   determining a load distribution of each object of the plurality of objects in relation to a subset of objects of the plurality of objects in the first stack formation;
   generating, using a generative adversarial network (GAN) algorithm and based on the load distribution for each object, a visualization depicting deformation of each object of the plurality of object in relation to the subset of objects of the plurality of objects in the first stack formation; and
   displaying the visualization depicting the deformation of each object of the plurality of objects to a user.

2. The method of claim 1, further comprising:
   determining a time period that the plurality of objects will be in the first stack formation;
   generating, using the GAN algorithm and based on the load distribution of each object, a sequence of predicted deformation patterns for each object of the plurality of objects over the time duration; and
   displaying the sequence of predicted deformation patterns for each object of the plurality of objects to the user over the time period.

3. The method of claim 1, further comprising:
   determining, based on the identified plurality of objects and the load distribution for each object in the first stack formation, a second stack formation that minimizes the deformation of each object of the plurality of objects in relation to the subset of objects of the plurality of objects;
   generating, using the GAN algorithm, a visualization of the minimized deformation of each object of the plurality objects in the second stack formation; and
   displaying the visualization of the plurality of objects in the second stack formation to the user.

4. The method of claim 3, further comprising:
   identifying, based on analysis of second image data, that a new object is being added to the plurality of objects that have been configured in the second stack formation by the user;
   assessing an impact of the new object on the load distribution of each object of the plurality of objects in the second stack formation;

determining a position for placement of the new object with the second stack formation, wherein the position for placement of the new object minimizes the deformation of each object in relation to the subset of objects in the second stack formation;

generating, using the GAN algorithm, a visualization of the position for placement of the new object within the second stack formation; and displaying the visualization of the position for placement of the new object within the second stack formation.

5. The method of claim 1, wherein generating the visualization depicting deformation of each object of the plurality of objects comprises analyzing packaging specifications of one or more objects of the plurality of objects.

6. The method of claim 1, wherein determining the load distribution of each object of the plurality of objects is based on a set of object attributes that are associated with a product identification code that was identified via the analysis of the image data.

7. The method of claim 1, wherein determining the load distribution of each object of the plurality of objects in relation to a subset of objects of the plurality of objects in the first stack formation includes determining a dynamic load distribution based on movement applied to the first stack formation.

8. The method of claim 1, wherein the image data is generated by an internet of things (IoT) camera.

9. The method of claim 1, wherein the visualization depicting the deformation of each object of the plurality of objects is displayed to the user via augmented reality glasses.

10. A system comprising:
a processor; and
a computer-readable storage medium communicatively coupled to the processor and storing program instructions which, when executed by the processor, cause the processor to perform a method comprising:
identifying, based on an analysis of image data, a plurality of objects that are in a first stack formation;
determining a load distribution of each object of the plurality of objects in relation to a subset of objects of the plurality of objects in the first stack formation;
generating, using a generative adversarial network (GAN) algorithm and based on the load distribution for each object, a visualization depicting deformation of each object of the plurality of object in relation to the subset of objects of the plurality of objects in the first stack formation; and
displaying the visualization depicting the deformation of each object of the plurality of objects to a user.

11. The system of claim 10, further comprising:
determining a time period that the plurality of objects will be in the first stack formation;
generating, using the GAN algorithm and based on the load distribution of each object, a sequence of predicted deformation patterns for each object of the plurality of objects over the time duration; and
displaying the sequence of predicated deformation patterns for each object of the plurality of objects to the user over the time period.

12. The system of claim 10, further comprising:
determining, based on the identified plurality of objects and the load distribution for each object in the first stack formation, a second stack formation that minimizes the deformation of each object of the plurality of objects in relation to the subset of objects of the plurality of objects;

generating, using the GAN algorithm, a visualization of the minimized deformation of each object of the plurality objects in the second stack formation; and displaying the visualization of the plurality of objects in the second stack formation to the user.

13. The system of claim 12, further comprising:
identifying, based on analysis of second image data, that a new object is being added to the plurality of objects that have been configured in the second stack formation by the user;
assessing an impact of the new object on the load distribution of each object of the plurality of objects in the second stack formation;
determining a position for placement of the new object with the second stack formation, wherein the position for placement of the new object minimizes the deformation of each object in relation to the subset of objects in the second stack formation;
generating, using the GAN algorithm, a visualization of the position for placement of the new object within the second stack formation; and
displaying the visualization of the position for placement of the new object within the second stack formation.

14. The system of claim 10, wherein generating the visualization depicting deformation of each object of the plurality of objects comprises analyzing packaging specifications of one or more objects of the plurality of objects.

15. The system of claim 10, wherein determining the load distribution of each object of the plurality of objects is based on a set of object attributes that are associated with a product identification code that was identified via the analysis of the image data.

16. The system of claim 10, wherein determining the load distribution of each object of the plurality of objects in relation to a subset of objects of the plurality of objects in the first stack formation includes determining a dynamic load distribution based on movement applied to the first stack formation.

17. A computer program product comprising a computer-readable storage medium having program instructions embodied therewith, the program instructions executable by a processor to cause the processor to perform a method comprising:
identifying, based on an analysis of image data, a plurality of objects that are in a first stack formation;
determining a load distribution of each object of the plurality of objects in relation to a subset of objects of the plurality of objects in the first stack formation;
generating, using a generative adversarial network (GAN) algorithm and based on the load distribution for each object, a visualization depicting deformation of each object of the plurality of object in relation to the subset of objects of the plurality of objects in the first stack formation; and
displaying the visualization depicting the deformation of each object of the plurality of objects to a user.

18. The computer program product of claim 17, further comprising:
determining a time period that the plurality of objects will be in the first stack formation;
generating, using the GAN algorithm and based on the load distribution of each object, a sequence of predicted deformation patterns for each object of the plurality of objects over the time duration; and
displaying the sequence of predicated deformation patterns for each object of the plurality of objects to the user over the time period.

19. The computer program product of claim 17, further comprising:
- determining, based on the identified plurality of objects and the load distribution for each object in the first stack formation, a second stack formation that minimizes the deformation of each object of the plurality of objects in relation to the subset of objects of the plurality of objects;
- generating, using the GAN algorithm, a visualization of the minimized deformation of each object of the plurality objects in the second stack formation; and
- displaying the visualization of the plurality of objects in the second stack formation to the user.

20. The computer program product of claim 19, further comprising:
- identifying, based on analysis of second image data, that a new object is being added to the plurality of objects that have been configured in the second stack formation by the user;
- assessing an impact of the new object on the load distribution of each object of the plurality of objects in the second stack formation;
- determining a position for placement of the new object with the second stack formation, wherein the position for placement of the new object minimizes the deformation of each object in relation to the subset of objects in the second stack formation;
- generating, using the GAN algorithm, a visualization of the position for placement of the new object within the second stack formation; and
- displaying the visualization of the position for placement of the new object within the second stack formation.

* * * * *